(12) United States Patent
Imanaga et al.

(10) Patent No.: US 11,098,216 B2
(45) Date of Patent: Aug. 24, 2021

(54) IMAGE FORMING METHOD, IMAGE FORMING APPARATUS, AND METHOD FOR MANUFACTURING PRINTED MATTER

(71) Applicants: Yukihiro Imanaga, Kanagawa (JP); Tomohiro Nakagawa, Kanagawa (JP); Juichi Furukawa, Kanagawa (JP); Satoyuki Sekiguchi, Kanagawa (JP); Ayaka Tanaka, Kanagawa (JP)

(72) Inventors: Yukihiro Imanaga, Kanagawa (JP); Tomohiro Nakagawa, Kanagawa (JP); Juichi Furukawa, Kanagawa (JP); Satoyuki Sekiguchi, Kanagawa (JP); Ayaka Tanaka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 365 days.

(21) Appl. No.: 16/136,791

(22) Filed: Sep. 20, 2018

(65) Prior Publication Data

US 2019/0092956 A1 Mar. 28, 2019

(30) Foreign Application Priority Data

Sep. 28, 2017 (JP) .............................. JP2017-187394
Jul. 27, 2018 (JP) .............................. JP2018-141116

(51) Int. Cl.
| | |
|---|---|
| *C09D 11/38* | (2014.01) |
| *C09D 11/40* | (2014.01) |
| *C09D 11/54* | (2014.01) |
| *C09D 11/102* | (2014.01) |
| *C09D 11/106* | (2014.01) |

(Continued)

(52) U.S. Cl.
CPC ............. *C09D 11/54* (2013.01); *B41J 2/2117* (2013.01); *B41M 5/0017* (2013.01); *B41M 5/0047* (2013.01); *B41M 5/0064* (2013.01); *C09D 11/102* (2013.01); *C09D 11/106* (2013.01); *C09D 11/107* (2013.01);
(Continued)

(58) Field of Classification Search
CPC combination set(s) only.
See application file for complete search history.

(56) References Cited

U.S. PATENT DOCUMENTS 9,340,692 B2 5/2016 Nakagawa et al.
9,663,668 B2 5/2017 Nakagawa et al.
(Continued)

FOREIGN PATENT DOCUMENTS

| JP | 2008-246837 | 10/2008 |
| JP | 2016-030776 | 3/2016 |

OTHER PUBLICATIONS

English translation of JP 2008/246837, Oct. 2008; 72 pages.*
English translation of JP 2016/030776, Mar. 2016; 21 pages.*

*Primary Examiner* — James E McDonough
(74) *Attorney, Agent, or Firm* — Oblon, McClelland, Maier & Neustadt, L.L.P.

(57) ABSTRACT

An image forming method for forming an image on a non-absorbable substrate includes (a) applying a surface processing composition including water, a first organic solvent, and a urethane resin particle to the non-absorbable substrate, (b) applying a non-white ink including water, a second organic solvent, and a second acrylic resin particle and (c) applying a white ink including water, a third organic solvent, a third acrylic resin particle, and a white colorant.

10 Claims, 2 Drawing Sheets

(51) Int. Cl.
  *C09D 11/107* (2014.01)
  *C09D 11/322* (2014.01)
  *B41M 5/00* (2006.01)
  *B41J 2/21* (2006.01)

(52) U.S. Cl.
  CPC ............ *C09D 11/322* (2013.01); *C09D 11/38* (2013.01); *C09D 11/40* (2013.01)

(56) References Cited

U.S. PATENT DOCUMENTS

| | | | |
|---|---|---|---|
| 9,982,151 | B2 | 5/2018 | Nagashima et al. |
| 10,011,728 | B2 | 7/2018 | Nakagawa et al. |
| 10,119,042 | B2 * | 11/2018 | Kido ...................... C09D 11/38 |
| 10,399,363 | B2 * | 9/2019 | Furukawa .............. C09D 11/38 |
| 10,519,331 | B2 * | 12/2019 | Kido .................... C09D 11/102 |
| 10,647,129 | B2 * | 5/2020 | Hanazawa .......... C08G 18/3206 |
| 10,676,628 | B2 * | 6/2020 | Saiga ................... B41M 5/0017 |
| 10,773,532 | B2 * | 9/2020 | Kaji ..................... B41M 5/0023 |
| 2009/0233061 | A1 * | 9/2009 | Irita ....................... C09D 11/40 428/195.1 |
| 2011/0293898 | A1 * | 12/2011 | Yatake .................. C09D 11/40 428/195.1 |
| 2016/0194824 | A1 * | 7/2016 | Ohashi ..................... D06P 1/44 347/20 |
| 2016/0272634 | A1 | 9/2016 | Kobayashi et al. |
| 2017/0051170 | A1 | 2/2017 | Nakagawa et al. |
| 2017/0166764 | A1 * | 6/2017 | Katsuragi ............ C09D 11/102 |
| 2017/0174919 | A1 | 6/2017 | Kido et al. |
| 2017/0247561 | A1 * | 8/2017 | Nakagawa ........... B41J 11/0015 |
| 2017/0267889 | A1 * | 9/2017 | Katsuragi ............ C09D 11/106 |
| 2018/0001669 | A1 | 1/2018 | Furukawa et al. |
| 2018/0127610 | A1 | 5/2018 | Kido et al. |
| 2018/0244943 | A1 * | 8/2018 | Okuda ................. C09D 11/322 |
| 2018/0265728 | A1 | 9/2018 | Hanazawa et al. |
| 2019/0031897 | A1 * | 1/2019 | Hirade ................. B41M 5/0017 |
| 2019/0077981 | A1 * | 3/2019 | Uotome ................. C09D 11/38 |
| 2019/0092959 | A1 * | 3/2019 | Matsuzaki ........... B41J 11/0015 |
| 2019/0105919 | A1 * | 4/2019 | Katsuragi .............. B41J 2/2114 |
| 2019/0168516 | A1 * | 6/2019 | Nakagawa ............. B41J 11/002 |

* cited by examiner

IMAGE FORMING METHOD, IMAGE FORMING APPARATUS, AND METHOD FOR MANUFACTURING PRINTED MATTER

CROSS-REFERENCE TO RELATED APPLICATIONS

This patent application is based on and claims priority pursuant to 35 U.S.C. § 119(a) to Japanese Patent Application Nos. 2017-187394 and 2018-141116, filed on Sep. 28, 2017 and Jul. 27, 2018, respectively, in the Japan Patent Office, the entire disclosure of each of which is hereby incorporated by reference herein.

BACKGROUND

Technical Field

The present disclosure relates to an image forming method, an image forming apparatus, and a method for manufacturing printed matter.

Description of the Related Art

Since inkjet printers are relatively quiet, enjoy low running costs, and are capable of easily printing color images, they are now widely used at home as an output device of digital signals. Technologies of printing images on packaging materials for food, beverages, commodities, etc. utilizing inkjet have also been developed.

As the substrate to which inkjet recording is applied, non-absorbable substrate such as plastic film has been used and inks have been developed for such substrates. Demands to directly print images, etc. on plastic film utilizing inkjet include, for example, package printing for food and commodities. In such applications, printed substrates are often visually observed at close range, so that extremely high image quality is demanded.

However, when images etc. are printed on a non-absorbable substrate utilizing inkjet, permeation drying does not occur. Therefore, ink droplets excessively spread to areas of outline characters (also referred to as negative characters), thereby rendering the characters illegible. This phenomenon of rendering characters illegible is referred to as "crushed negative characters".

SUMMARY

According to the present invention, provided is an improved image forming method for forming an image on a non-absorbable substrate including (a) applying a surface processing composition including water, a first organic solvent, and a urethane resin particle to the non-absorbable substrate, (b) applying a non-white ink including water, a second organic solvent, and a second acrylic resin particle and (c) applying a white ink including water, a third organic solvent, a third acrylic resin particle, and a white colorant.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
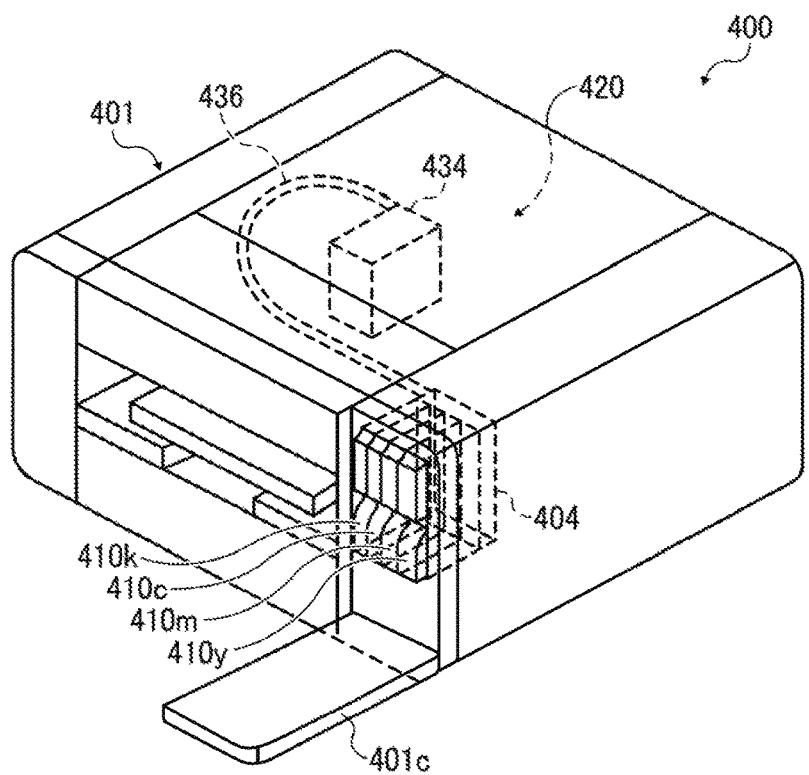
FIG. 1 is a perspective view illustrating a diagram of an example of the recording device.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

An object of the present disclosure is to provide an image forming method that is capable of forming an image having adhesiveness for non-absorbable substrate, suppressing bleeding, and forming a high-quality image.

Surface Processing Composition

The surface processing composition includes water, a first organic solvent, and a urethane resin particle.

Urethane Resin Particle

The urethane resin particle in the surface processing composition improves adhesiveness for a non-absorbable substrate. The kinds of the urethane resin particle are not particularly limited and can be suitably selected to suit to a particular application. It is possible to mix a resin emulsion in which the resin particle is dispersed in water serving as a dispersion medium with materials such as an organic solvent to obtain the surface processing composition.

The glass transition temperature Tg of the urethane resin particle is preferably −25° C. to 75° C. For improving adhesiveness, the glass transition temperature Tg of the urethane resin particle is preferably −25° C. to 25° C. and more preferably −25° C. to 10° C. The glass transition temperature Tg of the urethane resin particle can be measured by using a DSC (Thermo Plus EVO2/DSC).

The proportion of the urethane resin particle amount of the solid portion is preferably 0.5 to 20 percent by mass to the total amount of the surface processing composition. When the proportion is 0.5 percent by mass or more, the substrate can be fully covered by a urethane resin so that adhesiveness is improved. When the proportion is 20 percent by mass or less, the layer thickness is not excessively thick, so that the adhesiveness does not deteriorate.

The volume average particle diameter of the urethane resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness. The volume average particle diameter can be measured by using a particle size analyzer (Nanotrac Wave-UT151, manufactured by MicrotracBEL Corp.).

First Organic Solvent

There is no specific limitation on the type of the first organic solvent. For example, water-soluble organic solvents are usable. Examples of water-soluble organic solvents include polyols, ethers (e.g., polyol alkyl ethers, polyol aryl ethers), nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

In particular, first organic solvents having a boiling point of 250° C. or less are preferable since they can function as a wetting agent while providing good drying property.

In addition, polyol compounds having 8 or more carbon atoms and glycol ether compounds are also preferable. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

Preferably, the content rate of the first organic solvent in the surface processing composition is in the range of from 10% to 60% by mass, more preferably from 20% to 60% by mass, for drying property and discharge reliability of the surface processing composition.

Water

Preferably, the content rate of water in the surface processing composition is in the range of from 10% to 90% by mass, more preferably from 20% to 60% by mass, for drying property and discharge reliability of the surface processing composition.

Additives

The surface processing composition may further contain a flocculant, a surfactant, a defoamer, a preservative, a fungicide, a corrosion inhibitor, and/or a pH adjuster, if necessary. Examples of flocculants include, but are not limited to, water-soluble cationic polymers, acids, and multi-valent metal salts.

Multivalent Metal Salt

The multivalent metal salt quickly aggregates the coloring material after a droplet of the ink lands on a substrate so that occurrence of color bleeding is suppressed and coloring property is improved.

Specific examples of the multivalent metal salts include, but are not limited to, salts (multivalent metal salts) of titanium, chromium, copper, cobalt, strontium, barium, iron, aluminum, calcium, magnesium, and nickel.

Of these multivalent metal salts, in order to efficiently aggregate pigments, one or more of calcium salts, magnesium salts, and nickel salts, are preferable. Salts of alkali earth metal such as calcium and magnesium are more preferable.

In addition, ionic multivalent metal salts are preferable. In particular, when the multivalent metal salts are calcium salts, stability of the reaction liquid is better.

Specific examples of the multivalent metal salts include, but are not limited to, calcium carbonate, calcium nitride, calcium chloride, calcium acetate, calcium sulfate, magnesium chloride, magnesium acetate, magnesium sulfate, barium sulfate, zinc sulfide, zinc carbonate, aluminum silicate, calcium silicate, magnesium silicate, aluminum hydroxide.

Of these, calcium acetate is preferable to prevent degradation of strength of a previous layer (the previous layer is formed by the surface processing composition) caused by deliquescence.

When the concentration of the multivalent metal salt to the entire surface processing composition is 0.05-0.5 mol/kg, not only excellent storage stability is obtained but also occurrence of color bleeding can be suppressed.

Surfactant

Usable surfactants include silicone-based surfactants, fluorine-based surfactants, ampholytic surfactants, nonionic surfactants, and anionic surfactants.

The silicone-based surfactants have no specific limit and can be suitably selected to suit to a particular application. Preferred are silicone-based surfactants which are not decomposed even in a high pH environment. Specific examples thereof include, but are not limited to, side-chain-modified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure unit on a side chain thereof which is bonded to Si.

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain. These compounds have weak foaming property, which is preferable. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Preferably, the content rate of the surfactant in the surface processing composition is in the range of from 0.001% to 5% by mass, more preferably from 0.05% to 5% by mass, for improving wettability, discharge stability, and image quality.

Defoamer

Specific examples of the defoamer include, but are not limited to, silicone defoamers, polyether defoamers, and fatty acid ester defoamers. These defoamers can be used alone or in combination with others. Among these defoamers, silicone defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

pH Adjuster

The pH adjuster has no particular limit so long as it is capable of adjusting the pH to 7 or higher. Specific examples of such a pH adjuster include, but are not limited to, amines such as diethanolamine and triethanolamine.

Non-white Ink and White Ink

The non-white ink includes water, a second organic solvent, and a second acrylic resin particle. The white ink includes water, a third organic solvent, a third acrylic resin particle, and a white colorant. In the following disclosure, an "ink" refers to both the non-white ink and the white ink, unless otherwise specified.

Second Acrylic Resin Particle and Third Acrylic Resin Particle

The second acrylic resin particle in the non-white ink and the third acrylic resin particle in the white ink improve adhesiveness between a layer formed by the non-white ink and a layer formed by the white ink. The second acrylic resin particle and the third acrylic resin particle can be synthesized, or can be obtained commercially.

Specific examples of the second acrylic resin particle and the third acrylic resin particle available commercially include, but are not limited to, Microgel E-1002 and E-5002 (styrene-acrylic-based resin particles, manufactured by Nippon Paint co., Ltd.), Voncoat 4001 (acrylic-based resin particles, manufactured by Dainippon Ink and Chemicals, Inc.), Voncoat 5454 (styrene/acrylic-based resin particles, manufactured by Dainippon Ink and Chemicals, Inc.), SAE-1014 (styrene-acrylic-based resin particles, manufactured by Nippon Zeon Co., Ltd.), and Saivinol SK-200 (acrylic-based resin particles, manufactured by Saiden Chemical Industry Co., Ltd.), Primal AC-22 and AC-61 (acrylic-based resin particles, manufactured by Rohm and Haas Electronic Materials K.K.), NANOCRYL SBCX-2821 and 3689 (acrylic-silicone-based resin particles, manufactured by Toyo Ink Co., Ltd.).

The glass transition temperature Tg of the second acrylic resin particle and the third acrylic resin particle are preferably –30° C. to 100° C. For improving discharge stability and abrasion resistance, the glass transition temperature Tg of the second acrylic resin particle and third acrylic resin particle are preferably 0° C. to 100° C. and more preferably 12° C. to 82° C. The glass transition temperature Tg of the second acrylic resin particle and third acrylic resin particle can be measured by using a DSC (Thermo Plus EVO2/DSC).

The proportion of the second acrylic resin particle and the third acrylic resin particle are not particularly limited and can be suitably selected to suit to a particular application. The proportion of the second acrylic resin particle is preferably from 1 to 30 percent by mass to the total content of the non-white ink. The proportion of the third acrylic resin particle is preferably from 1 to 30 percent by mass to the total content of the white ink.

The volume average particle diameter of the acrylic resin particle is not particularly limited and can be suitably selected to suit to a particular application. The volume average particle diameter is preferably from 10 to 1,000 nm to obtain good fixability and image hardness. The volume average particle diameter can be measured by using a particle size analyzer (Nanotrac Wave-UT151, manufactured by MicrotracBEL Corp.).

Water

Optionally, water can be added to the ink in the present disclosure as in the case of the surface processing composition.

Second Organic Solvent and Third Organic Solvent

The second organic solvent can be added to the non-white ink in the present disclosure as in the case of the surface processing composition. The third organic solvent can be added to the white ink in the present disclosure as in the case of the surface processing composition.

Coloring Material

The coloring material for use in the white ink has no particular limit as long as it shows white color and can be suitably selected to suit to a particular application. For example, an inorganic white pigment, an organic white pigment, and a hollow particle are suitable. These coloring materials for use in the white ink can be used alone or in combination with others. Among these coloring materials for use in the white ink, the inorganic white pigment and the hollow particle are preferable. In addition, "non-white" means colored or colorless.

ISO-2469 (JIS-8148) is used as the reference of the degree of white of the white ink. In general, an article having a degree of white of equal to or greater than 70 is used as white coloring material.

A white particle having a hollow structure (a hollow particle) can be added to the white ink. Examples are hollow resin particles and hollow inorganic particles.

Specific examples of the inorganic white pigments include, but are not limited to, sulfates of alkali earth metals such as barium sulfide, carbonates of alkali earth metals such as calcium carbonates, silicas such as fine powder of silicic acid and synthetic silicate, calcium silicate, alumina, hydrated alumina, titanium oxide, zinc oxide, talc, and clay. These inorganic white pigments for use in the white ink can be used alone or in combination with others. Among these inorganic white pigments for use in the white ink, titanium oxide is preferable.

Examples of the resin composition of the hollow resin particle are acrylic resins, styrene-acrylic resins, cross-linking type styrene-acrylic resins, urethane resins, and maleic-acid based resins.

As the material of the hollow inorganic resin, for example, oxides, nitrides, and oxynitrides of metal such as silicon, aluminum, titanium, strontium, and zirconium showing color of white and inorganic compounds such as glass and silica.

Examples of the non-white ink are color ink, black ink, gray ink, clear ink, and metallic ink. The clear ink is defined as an ink comprising no coloring material and mainly comprising resin particles, organic solvent, and water. Even if the clear ink is used as the non-white ink, some embodiments of the present invention can suppress bleeding at the boundary between the white ink and the clear ink. In addition, some embodiments of the present invention can suppress bleeding at the boundary between the color ink and the clear ink.

Specific examples of the color ink include, but are not limited to, cyan ink, magenta ink, yellow ink, light cyan ink, light magenta ink, red ink, green ink, blue ink, orange ink, and violet ink.

The coloring material for use in the non-white ink has no particular limit as long as it shows non-white color and can be suitably selected to suit to a particular application. For example, dyes and pigments are suitable. These can be used alone or in combination. Of these, pigments are preferable.

Pigments are preferable among these colorants. Usable pigments include both inorganic pigments and organic pigments.

Specific examples of inorganic pigments include, but are not limited to, titanium oxide, iron oxide, calcium carbonate, barium sulfate, aluminum hydroxide, barium yellow, cadmium red, chrome yellow, and carbon black produced by a known method, such as a contact method, a furnace method, and a thermal method. One pigment can be used alone, or two or more pigments can be used in combination.

Among these pigments, those having good affinity for solvents are preferable.

In addition, resin hollow particles and inorganic hollow particles can also be used for the non-white ink.

Specific examples of the pigments usable for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1). One pigment can be used alone, or two or more pigments can be used in combination.

Specific examples of pigments used for color printing include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; C.I. Pigment Blue 1, 2, 15 (phthalocyanine blue), 15:1, 15:2, 15:3, 15:4 (phthalocyanine blue), 16, 17:1, 56, 60, and 63; and C.I. Pigment Green 1, 4, 7, 8, 10, 17, 18, and 36. One pigment can be used alone, or two or more pigments can be used in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35. One pigment can be used alone, or two or more pigments can be used in combination.

Examples of the coloring material for use in metallic ink are fine powder prepared by fine pulverization of metal, alloyed metal, or a metal compound. Specific examples include, but are not limited to, fine powders obtained by finely-pulverizing metal selected from the group consisting of aluminum, silver, gold, nickel, chromium, tin, zinc, indium, titanium, silicon, copper, and platinum or alloyed metal thereof or an oxide, a nitride, or a sulfide, or a carbide of the metal and alloyed metal and any combination thereof.

Preferably, the content rate of the colorant in the ink is in the range of from 0.1% to 15% by mass, more preferably from 1% to 10% by mass, for improving image density, fixing strength, and discharge stability.

Pigment Dispersion

The ink can be obtained by mixing the colorant with other materials such as water and the organic solvent. The ink can also be obtained by, first, preparing a pigment dispersion by mixing the pigment with water, a pigment dispersant, etc., and thereafter mixing the pigment dispersion with other materials such as water and the organic solvent.

The pigment can be dispersed in the ink by any of the following methods: introducing a hydrophilic functional group to the pigment to make the pigment self-dispersible; covering the surface of the pigment with a resin; and dispersing the pigment by a dispersant.

In the method of introducing a hydrophilic functional group to the pigment to make the pigment self-dispersible, for example, a functional group such as sulfone group and carboxyl group may be introduced to the pigment (e.g., carbon) to make the pigment dispersible in water.

In the method of covering the surface of the pigment with a resin, for example, the pigment may be incorporated in a microcapsule to make the pigment self-dispersible in water. In this case, the pigment may be referred to as a resin-covered pigment. In this case, not all the pigment particles included in the ink should be covered with a resin. It is possible that a part of the pigment particles are not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used as the dispersant depending on the property of the pigment.

For example, a nonionic surfactant RT-100 (product of Takemoto Oil & Fat Co., Ltd.) and sodium naphthalene-sulfonate formalin condensate are preferably used as the dispersant.

One dispersant can be used alone, and two or more dispersants can be used in combination.

The pigment dispersion can be obtained by mixing water, the pigment, a pigment dispersant, and other components. The pigment is dispersed in the pigment dispersion with the adjusted particle diameter. Preferably, the pigment dispersion is prepared with a disperser.

The particle diameter of the pigment in a pigment dispersion has no particular limit. For example, it is preferable that non-white pigment in the non-white ink has a volume average particle diameter of from 30 to 110 nm to improve dispersion stability of a pigment, discharging stability, and image quality such as image density. With regard to the hollow resin particle in the white ink, the volume average particle diameter is preferably from 200 to 1000 nm to obtain excellent dispersion stability and a high degree of white. With regard to the hollow inorganic particle in the white ink, the volume average particle diameter is preferably from 10 to 200 nm to obtain excellent dispersion stability and a high degree of white.

The particle diameter of the pigment can be measured using a particle size analyzer (Nanotrac Wave-UT151, manufactured by MicrotracBEL Corp).

With regard to the inorganic white pigments in the white ink, the volume average particle diameter is preferably from 100 to 350 nm, more preferably from 200 to 300 rm. When the volume average particle diameter is 100 nm or more, concealing property is improved. When the volume average particle diameter is 350 nm or less, dispersion stability and discharge reliability of the white ink are improved. The volume average particle diameter of the inorganic white pigments can be measured by using a laser diffraction particle size distribution measuring apparatus.

Preferably, the content rate of the pigment in the pigment dispersion is in the range of from 0.1% to 50% by mass, more preferably from 0.1% to 30% by mass, for improving discharge stability and image density.

Preferably, the pigment dispersion may be subjected to filtration using a filter or a centrifugal separator to remove coarse particles, and thereafter to degassing.

Additives Like the surface processing composition, the ink may further contain a flocculant, a surfactant, a defoamer, a preservative, a fungicide, a corrosion inhibitor, and/or a pH adjuster, if necessary.

Method of Manufacturing Ink

The ink may be produced by dispersing or dissolving the composition mentioned above in an aqueous medium, followed by optional stirring and mixing. The stirring and mixing may be performed by a stirrer equipped with stirring blades, a magnetic stirrer, or a high-speed disperser.

Property of Ink

The property of the ink is not particularly limited and can be suitably selected to suit to a particular application.

Preferably, the ink has a viscosity at 25° C. in the range of from 5 to 30 mPa·s, more preferably from 5 to 25 mPa·s, to improve print density and text quality and obtain good dischargeability. The viscosity can be measured at 25° C. by a rotatory viscometer (RE-80L available from Toki Sangyo Co., Ltd.) equipped with a standard cone rotor (1° 34'×R24), while setting the sample liquid amount to 1.2 mL, the number of rotations to 50 rotations per minute (rpm), and the measuring time to 3 minutes.

Preferably, the ink has a surface tension of 35 mN/m or less, more preferably 32 mN/m or less, at 25° C., so that the ink is suitably levelized on a recording medium and the drying time of the ink is shortened.

Preferably, the ink has a pH in the range of from 7 to 12, more preferably from 8 to 11, in terms of prevention of corrosion of metal materials contacting the ink.

Recording Medium (Substrate)

The recording medium (also referred to as "substrate") according to some embodiments of the present invention is not particularly limited. For example, plain paper, gloss paper, special paper, and cloth are usable. Also, non-absorbable substrates are preferably used.

The non-absorbable substrate has a surface with a low level of moisture permeability, absorptivity, and/or adsorptivity. Examples of such a non-absorbable substrate include a material having a number of hollow spaces inside but not open to the exterior. To be more quantitative, the non-absorbable substrate refers to a substrate that absorbs water in an amount of 10 mL/m$^2$ or less between a contact start time and 30 msec$^{1/2}$ after the contact start, measured according to the Bristow method.

Among these non-absorbable substrates, polypropylene films, polyethylene terephthalate films, and nylon films are preferable, since the ink can show good adhesion to these films.

Specific examples of polypropylene films include, but are not limited to, P-2002, P-2161, and P-4166 (all available from Toyobo Co., Ltd.); PA-20, PA-30, and PA-20W (all available from SUNTOX Co., Ltd.); and FOA, FOS, and FOR (all available from Futamura Chemical Co., Ltd.).

Specific examples of polyethylene terephthalate films include, but are not limited to, E-5100 and E5102 (all available from Toyobo Co., Ltd.); P60 and P375 (all available from Toray Industries, Inc.); and G2, G2P2, K, and SL (all available from Teijin DuPont Films Japan Limited).

Specific examples of nylon films include, but are not limited to, HARDEN FILM N-1100, N-1102, and N-1200 (all available from Toyobo Co., Ltd.) and ON, NX, MS, and NK (all available from UNITIKA LTD.).

Image Forming Method and Image Forming Apparatus

In accordance with some embodiments of the present invention, the image forming method is provided that includes the steps of: (a) applying a surface processing composition including water, a first organic solvent, and a urethane resin particle to the non-absorbable substrate; (b) applying a non-white ink including water, a second organic solvent, and a second acrylic resin particle; and (c) applying a white ink including water, a third organic solvent, a third acrylic resin particle, and a white colorant.

In accordance with some embodiments of the present invention, the image forming apparatus is provided that includes the means of: a first applier configured to apply a surface processing composition including water, a first organic solvent, and a urethane resin particle to the non-absorbable substrate; a second applier configured to apply a non-white ink including water, a second organic solvent, and a second acrylic resin particle; and a third applier configured to apply a white ink including water, a third organic solvent, a third acrylic resin particle, and a white colorant.

The above surface processing composition, non-white ink, and white ink can be used for the image forming method and image forming apparatus.

Preferred methods of applying processing composition, non-white ink, and white ink include, but are not limited to, an inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The image forming method of the present disclosure preferably includes a step of reforming the surface of the non-absorbable substrate (surface reforming step). The surface reforming step can suppress uneven application of the surface processing composition to the non-absorbable substrate and improve attachability.

Examples of such methods are corona discharging treatment, streamer discharging treatment, atmospheric pressure plasma processing, frame processing, and ultraviolet irradiation processing. These known processing methods can be executed by a known device.

Of these processing methods, corona discharging treatment, and streamer discharging treatment are preferable. In comparison with atmospheric pressure plasma processing, frame processing, and ultraviolet irradiation processing, corona discharging treatment and streamer discharging treatment are preferably used because the output performance stability of discharging is stable and surface treatment can be uniformly conducted on a recording surface.

It is possible and preferable to provide a heating process after the ink discharging. The heating process reduces residual solvent in an ink coating and further improve adhesion.

Therefore, some embodiments of the present invention are preferable comprising a first heat treatment step of applying heat treatment after applying non-white ink and a second heat treatment step of applying heat treatment after applying white ink. It is preferable to have both the first heat treatment step and the second heat treatment step. However, the above effect can be expected even if some embodiments of the present invention has one of the first heat treatment step and the second heat treatment step.

Preferably, heating temperature in the first and second heat treatment step are in the range of from 50° C. to 130° C. Preferably, heating time in the first and second heat treatment step are in the range of from 1 second to 120 seconds, more preferably from 1 second to 30 seconds.

The non-white ink may include a non-white colorant. The step (b) may include applying multiple kinds of the non-white ink with different colorant type. When step (b) includes applying multiple kinds of the non-white ink, all non-white inks need to contain the acrylic resin particle.

The image forming method in the present disclosure can be suitably used for various printing devices employing an inkjet printing method such as printers, facsimile machines, photocopiers, multifunction peripherals (serving as a printer, a facsimile machine, and a photocopier), and 3D object manufacturing devices (3D printers, additive manufacturing device).

In the present disclosure, the recording device and the recording method respectively represent a device capable of attaching (applying) an ink and the surface processing composition of the present disclosure to a recording (print) medium and a method of printing an image on the print medium using the device. The print (recording) medium means an article to which the ink or the various processing fluids can be attached at least temporarily.

The recording device may further optionally include a device relating to sheet (print medium) feeding, conveying, and ejecting the print medium and other devices referred to as a pre-processing device, a post-processing device, etc. in addition to the head portion to discharge the ink.

The recording device and the recording method may further optionally include a heater for use in the heating process and a drier for use in the drying process. The heating device and the drying device include, for example, devices to heat and dry the print surface and the reverse surface of a print medium. The heating device and the drying device are not particularly limited. For example, a fan heater and an infra-red heater can be used. The print medium can be heated and dried before, during, and after printing.

In addition, the recording device and the recording method are not limited to those producing merely meaningful visible images such as texts and figures with the ink. For example, the recording device and the recording method can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a device capable of printing images on a large print medium such as A0, a continuous printer capable of using continuous paper reeled up in a roll form as recording media.

Figure 2:
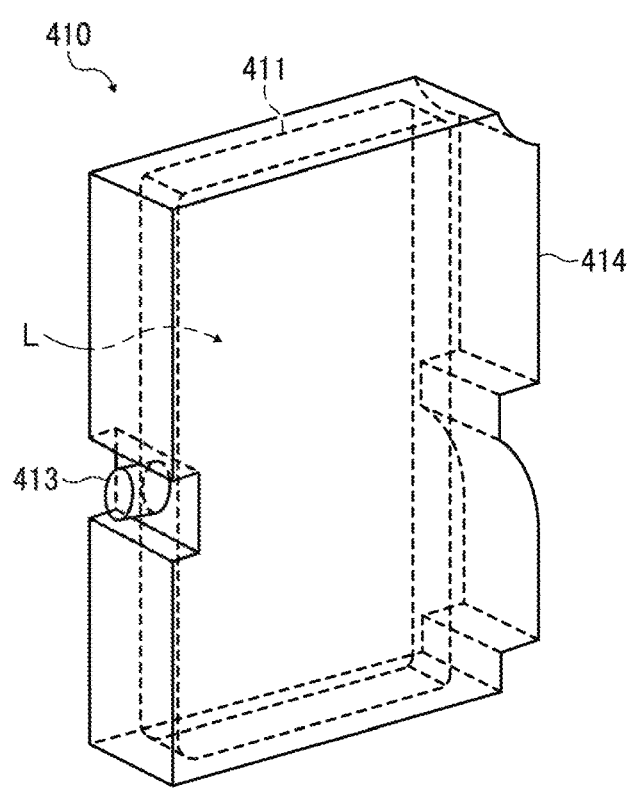
FIG. 2 is a perspective view illustrating a diagram of an example of the ink container.

The recording device of the present disclosure is described using an example with reference to FIG. 1 and FIG. 2. FIG. 1 is a diagram illustrating a perspective view of the recording device. FIG. 2 is a diagram illustrating a perspective view of the main tank. An image forming apparatus 400 as an example of the recording (printing) device is a serial type image forming apparatus. A mechanical unit 420 is disposed in a housing 401 of the image forming apparatus 400. Each ink accommodating unit (ink container) 411 of each main tank 410 (410*k*, 410*c*, 410*m*, and 410*y*) for each color of black (K), cyan (C), magenta (M), and yellow (Y) is made of a packaging member such as aluminum laminate film. The ink container 411 is, for example, accommodated in a plastic housing unit 414. As a result, the main tank 410 is used as an ink cartridge of each color.

A cartridge holder 404 is disposed on the rear side of the opening when a cover 401*c* is opened. The cartridge holder 404 is detachably attachable to the main tank 410. As a result, each ink discharging outlet 413 of the main tank 410 communicates with a discharging head 434 for each color via a supplying tube 436 for each color so that the ink can be discharged from the discharging head 434 to a print (recording) medium.

This recording device may include not only a portion discharging ink but also a pre-processing device and a post-processing device. The pre-processing device may apply the surface processing composition and the post-processing device may apply the white ink.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

Printed Matter and Method of Manufacturing Printed Matter

In accordance with some embodiments of the present invention, the method of manufacturing printed matter is provided that includes the steps of: (a) applying a surface processing composition including water, a first organic solvent, and a urethane resin particle to the non-absorbable substrate; (b) applying a non-white ink including water, a second organic solvent, and a second acrylic resin particle; and (c) applying a white ink including water, a third organic solvent, a third acrylic resin particle, and a white colorant.

Figure 3:
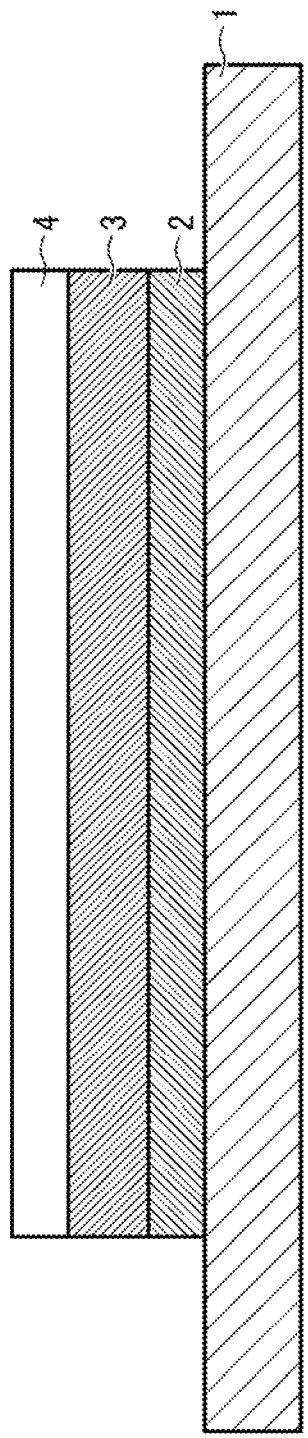
FIG. 3 is a sectional view illustrating a diagram of an example of the printed matter.

FIG. 3 is a sectional view illustrating a diagram of an example of the printed matter. The printed matter according to some embodiments is formed by a base material 1, a pre-coating layer 2, a non-white ink layer 3, and a white ink layer 4, and the layers are formed in this order. The pre-coating layer 2 is a layer formed by the surface processing composition, the non-white ink layer 3 is a layer formed by the non-white ink, and the white ink layer 4 is a layer formed by the white ink.

Preferably, the thickness of the pre-coating layer 2 is in the range of from 0.05 μm to 0.5 μm. Preferably, the thickness of the non-white ink layer 3 is in the range of from 0.5 μm to 3 μm. Preferably, the thickness of the white ink layer 4 is in the range of from 1 μm to 4 μm.

The present disclosure describes an example using one kind of non-white ink. However, it is not limited to using one type of non-white ink. The non-white ink may include a non-white colorant. The step (b) may include applying multiple kinds of the non-white ink with different colorant type. A plurality of non-white ink layers may be formed. In this case, the place where the plurality of non-white ink layers is formed can be changed. The plurality of non-white ink layers may be formed by overlapping in the thickness direction, or may be formed by being adjacent to each other in the planar direction.

EXAMPLES

Next, the present disclosure is described in detail with reference to Examples and Comparative Examples but not limited thereto. "Part" represents "parts by mass" unless otherwise specified, and "%" represents "% by mass" unless otherwise specified.

Preparation of Urethane Resin Emulsion A 1,500 g of polyester polyol (POLILIGHT OD-X-2420, manufactured by DIC Corporation), 220 g of 2,2-dimethyl propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60 degrees C. to dissolve DMPA. Thereafter, 1,445 g of 4,4'dicyclohexyl methane diisocyanate and 2.6 g of dibutyl tin laurylate (catalyst) were added thereto and the resultant was heated to 90 degrees C. to complete urethanation reaction in five hours. As a resultant, a urethane prepolymer having an isocyanate group at its distal end was obtained. This reaction mixture was cooled down to 80 degrees C. and 149 g of triethyl amine was admixed therewith. 4,340 g of the resultant mixture was extracted and charged in a liquid mixture of 5,400 g of water and 15 g of triethyl amine under vigorous stirring. Thereafter, 1,500 g of ice was charged into the resultant and 626 g of 35 percent 2-methyl-1,5-pentane diamine aqueous solution was added to conduct chain elongation reaction followed by distillation away of the solvent in such a manner that the solid portion concentration was 30 percent. The thus-obtained resin emulsion was subject to dispersion treatment by a paint conditioner (speed adjustable in the range of 50-1,425 rpm, manufactured by Red Devil, Inc.) to obtain a polyester-based urethane resin A having a solid portion of 40.0 percent having a glass transition temperature (Tg) of 10 degrees C. as measured by differential scanning calorimetry (thermo plus EVO2/DSC, manufactured by Rigaku Corporation).

Preparation of Urethane Resin Emulsion B

A polyether-based urethane resin emulsion B having a solid portion of 30.0 percent having a glass transition temperature (Tg) of 75 degrees C. was obtained in the same manner as in the preparation of the resin emulsion A except that polyetherpolyol (HIFLEX D2000, manufactured by DKS Co. Ltd.) was used instead of POLILIGHT OD-X-2420 (manufactured by DIC Corporation).

Preparation of Urethane Resin Emulsion C

A simple pressure reactor equipped with a stirrer and a heater was charged with 287.9 parts of a crystalline polycarbonate diol (DURANOL™ T6002 available from Asahi Kasei Chemicals Corp.) having a number average molecular weight (Mn) of 2,000, 3.6 parts of 1,4-butanediol, 8.9 parts of DMPA (dimethylol propionic acid), 98.3 parts of hydrogenated MDI (Diphenylmethane diisocyanate), and 326.2 parts of acetone while introducing nitrogen thereto. The contents were heated to 90° C. and subjected to a urethane-forming reaction over a period of 8 hours to produce a prepolymer. The reaction product mixture was cooled to 40° C. and mixed with 6.8 parts of triethylamine. The mixture was further mixed with 568.8 parts of water, and emulsification was caused by a rotor-stator-type mechanical emulsifier. Thus, an aqueous dispersion was prepared. Next, 28.1 parts of a 10% aqueous solution of ethylenediamine was added to the above-obtained aqueous dispersion being stirred. The aqueous dispersion was further stirred for 5 hours at 50° C. to cause a chain elongation reaction. Acetone was removed from the aqueous dispersion under reduced pressure at 65° C., and the moisture content was controlled. Thus, a polycarbonate-based urethane resin emulsion C having a solid content of 40% by mass having a glass transition temperature (Tg) of −20 degrees C. was prepared.

Preparation of Acrylic Resin Emulsion D

VONCOAT CF-6140 (manufactured by DIC, Tg: 12 degrees C.) was used as acrylic resin emulsion D.

Preparation of Acrylic Resin Emulsion E

Vinyblan 2686 (manufactured by Nissin Chemical, Tg: −30 degrees C.) was used as acrylic resin emulsion E.

Preparation of Acrylic Resin Emulsion F

JE-1056 (manufactured by Seico PMC, Tg: 82 degrees C.) was used as acrylic resin emulsion F.

Preparation of Surface Processing Composition 1

The following recipe was mixed and stirred and filtrated by a filter having an opening of 5 μm (Minisart, manufactured by Sartorius Stedim Biotech GmbH) to obtain a liquid composition of liquid composition Example 1.

| | |
|---|---|
| 1,2-propane diol: | 10 parts |
| EMULGEN LS-106 (nonionic surfactant, manufactured by Kao Corporation): | 1 part |
| Calcium acetate monohydrate: | 1.76 parts |
| polyester-based urethane resin emulsion A (content of solid portion): | 10 parts |
| PROXEL LV: preservatives and fungicides, manufactured by AVECIA GROUP: | 0.1 parts |
| Deionized water: | 77.14 parts |

The surface processing composition 2-10 were prepared in the same manner as in the surface processing composition 1 except that the recipes shown in Table 1 were used.

TABLE 1

| | | Preparation Example No. | | | | | | | | | |
|---|---|---|---|---|---|---|---|---|---|---|---|
| Surface processing composition | | 1 | 2 | 3 | 4 | 5 | 6 | 7 | 8 | 9 | 10 |
| Mixing ratio | 1,2-propane diol | 10 | 10 | 10 | 10 | 10 | 10 | 10 | 10 | 10 | 10 |
| | EMULGEN LS-106 | 1 | 1 | 1 | 1 | 1 | 1 | 1 | 1 | 1 | 1 |
| | Calcium acetate monohydrate | 1.76 | 3.52 | 3.52 | 3.52 | 1.76 | 3.52 | 1.76 | 3.52 | 1.76 | 1.76 |
| | Urethane resin emulsion A (content of solid portion) | 10 | 0.5 | 20 | | | 0.3 | 22 | | | |
| | Urethane resin emulsion B (content of solid portion) | | | | 10 | | | | | | |
| | Urethane resin emulsion C (content of solid portion) | | | | | 10 | | | | | |
| | Acrylic resin emulsion D (content of solid portion) | | | | | | | | 10 | | |
| | Acrylic resin emulsion E (content of solid portion) | | | | | | | | | 10 | |
| | Acrylic resin emulsion F (content of solid portion) | | | | | | | | | | 10 |
| | PROXEL LV | 0.1 | 0.1 | 0.1 | 0.1 | 0.1 | 0.1 | 0.1 | 0.1 | 0.1 | 0.1 |
| | Deionized water | Rest | Rest | Rest | Rest | Rest | Rest | Rest | Rest | Rest | Rest |

The content of the emulsion A-F in Table 1 represents content of solid portion.

Preparation of Black Pigment Dispersion 100 g of carbon black (SEAST SP, SRF-LS, manufactured by TOKAI CARBON CO., LTD.) was added to 3,000 mL of 2.5 N (normal) sodium hypochlorite followed by stirring at 300 rpm at 60 degrees C. Subsequent to reaction for ten hours for oxidation, a pigment in which a carboxylic acid group was placed on the surface of carbon black was obtained. The reaction liquid was filtrated and the thus-filtered carbon black was neutralized by sodium hydroxide solution followed by ultrafiltration. Thereafter, subsequent to ultrafiltration by dialysis membrane using the pigment dispersion and deionized water followed by ultrasonic dispersion, black pigment dispersion having a volume average particle diameter of 100 nm with a solid portion concentrated to 20 percent was obtained.

Preparation of Cyan Pigment Dispersion

Cyan pigment dispersion having a volume average particle diameter of 75 nm was obtained in the same manner as in the case of the preparation of the black pigment dispersion except that the coloring material was changed to copper phthalocyanine pigment (LX4033, C.I. Pigment 15:4, manufactured by TOYO INK CO., LTD.).

Preparation of Magenta Pigment Dispersion

Magenta pigment dispersion having a volume average particle diameter of 73 nm was obtained in the same manner as in the case of the preparation of the black pigment dispersion except that the coloring material was changed to Pigment Red 122 (manufactured by Sun Chemical).

Preparation of Yellow Pigment Dispersion

Yellow pigment dispersion having a volume average particle diameter of 82 nm was obtained in the same manner as in the case of the preparation of the black pigment dispersion A except that the coloring material was changed to Pigment Yellow 74 (Yellow No. 46, manufactured by Dainichiseika Color & Chemicals Mfg. Co., Ltd.).

Preparation of White Pigment Dispersion 25 g of titanium oxide (STR-100W, manufactured by Sakai Chemical Industry Co., Ltd.), 5 g of pigment dispersant (TEGO Dispers 651, manufactured by Evonik Japan Co., Ltd.), and 70 g of water were mixed followed by dispersion using a bead mill (research labo, manufactured by Shinmaru Enterprises Corporation) with zirconia beads having a diameter of 0.3 mm and a filling ratio of 60 percent at 8 m/s for five minutes to obtain a white pigment dispersion having a volume average particle diameter of 285 nm.

Preparation Method of Ink

The recipe shown in Table 2-3 was mixed and stirred to prepare ink. The non-white ink was filtrated by a polypropylene filter of 0.2 μm and the white ink was filtrated by a polypropylene filter of 0.5 μm. In addition, FS-300 (manufactured by E. I. du Pont de Nemours and Company) was used as surfactant.

TABLE 2

| | Non-white ink | \multicolumn{9}{c}{Preparation Example No.} |
| | | 1 | 2 | 3 | 4 | 5 | 6 | 7 | 8 | 9 |
|---|---|---|---|---|---|---|---|---|---|---|
| Mixing ratio | Black pigment dispersion (content of solid portion) | 4 | | | | 4 | 4 | 4 | 4 | 4 |
| | Cyan pigment dispersion (content of solid portion) | | 4 | | | | | | | |
| | Magenta pigment dispersion (content of solid portion) | | | 4 | | | | | | |
| | Yellow pigment dispersion (content of solid portion) | | | | 4 | | | | | |
| | White pigment dispersion (content of solid portion) | | | | | | | | | |
| | Urethane resin emulsion A (content of solid portion) | | | | | | | 7 | | |
| | Urethane resin emulsion B (content of solid portion) | | | | | | | | 7 | |
| | Urethane resin emulsion C (content of solid portion) | | | | | | | | | 7 |
| | Acrylic resin emulsion D (content of solid portion) | 7 | 7 | 7 | 7 | | | | | |
| | Acrylic resin emulsion E (content of solid portion) | | | | | 7 | | | | |
| | Acrylic resin emulsion F (content of solid portion) | | | | | | 7 | | | |
| | 1,2-propane diol | 30 | 30 | 30 | 30 | 30 | 30 | 30 | 30 | 30 |
| | Diethylene glycol monobutyl ether | 5 | 5 | 5 | 5 | 5 | 5 | 5 | 5 | 5 |
| | FS-300 | 2 | 2 | 2 | 2 | 2 | 2 | 2 | 2 | 2 |
| | PROXEL LV | 0.1 | 0.1 | 0.1 | 0.1 | 0.1 | 0.1 | 0.1 | 0.1 | 0.1 |
| | Deionized water | Rest | Rest | Rest | Rest | Rest | Rest | Rest | Rest | Rest |

TABLE 3

| | White ink | \multicolumn{6}{c}{Preparation Example No.} |
| | | 1 | 2 | 3 | 4 | 5 | 6 |
|---|---|---|---|---|---|---|---|
| Mixing ratio | Black pigment dispersion (content of solid portion) | | | | | | |
| | Cyan pigment dispersion (content of solid portion) | | | | | | |
| | Magenta pigment dispersion (content of solid portion) | | | | | | |
| | Yellow pigment dispersion (content of solid portion) | | | | | | |
| | White pigment dispersion (content of solid portion) | 7 | 7 | 7 | 7 | 7 | 7 |
| | Urethane resin emulsion A (content of solid portion) | | | | 7 | | |
| | Urethane resin emulsion B (content of solid portion) | | | | | 7 | |
| | Urethane resin emulsion C (content of solid portion) | | | | | | 7 |
| | Acrylic resin emulsion D (content of solid portion) | 7 | | | | | |
| | Acrylic resin emulsion E (content of solid portion) | | 7 | | | | |
| | Acrylic resin emulsion F (content of solid portion) | | | 7 | | | |
| | 1,2-propane diol | 30 | 30 | 30 | 30 | 30 | 30 |
| | Diethylene glycol monobutyl ether | 5 | 5 | 5 | 5 | 5 | 5 |
| | FS-300 | 2 | 2 | 2 | 2 | 2 | 2 |
| | PROXEL LV | 0.1 | 0.1 | 0.1 | 0.1 | 0.1 | 0.1 |
| | Deionized water | Rest | Rest | Rest | Rest | Rest | Rest |

The content of the pigment dispersion and the emulsion A-F in Table 2-3 represent content of solid portion.

Examples 1

The surface processing composition, non-white ink and white ink shown in Table 4 were evaluated according to the following criteria.

Evaluation of Adhesiveness

An inkjet printer (remodeled based on IPSiO GXe5500 manufactured by Ricoh Company, Ltd.) having a bar coater was filled with the non-white ink, the white ink, and the surface processing composition. The non-white ink and the white ink were printed by the inkjet method. The surface processing composition was applied with a bar coater. An OPP film (PYLEN® P2101, manufactured by TOYOBO CO., LTD.), a PET film (ESPET® E5100, manufactured by TOYOBO CO., LTD.), and an ONY film (Harden® N 1100, manufactured by TOYOBO CO., LTD.) whose surfaces had been subjected to corona treatment in advance were applied with the surface processing composition with a bar coater No. 1 and dried. Next, a test image was printed using the non-white ink 1 and the non-white ink 2 so as not to substantially overlap the non-white ink 1 and the non-white ink 2 and dried at 80 degrees C. for 2 minutes. Thereafter, a white ink solid image was printed using the white ink and dried at 80 degrees C. for 2 minutes. The solid image was subjected to the cross-cut peel test using a piece of the close adhesive tape (available from Nichiban Co., Ltd., 123LW-50). adhesiveness was evaluated according to the following criteria. The obtained evaluation result achieving B or greater is desirable.

[Evaluation Criteria]
A: No peeling is seen on any of 100 squares.
B: 1 to 5 of 100 squares are peeled off.
C: More than 6 out of 100 squares are peeled off.

Evaluation of Bleeding on Color Boundary

The following evaluation of bleeding on color boundary was performed by using the printed matter obtained by the evaluation of adhesiveness. The bleeding at the portion where two colors (the non-white ink 1 and the non-white ink 2) are in contact was observed for each duty and evaluated according to the following criteria. In addition, the place where bleeding does not occur is represented as X, and the place where bleeding occurs is represented as Y.

The obtained evaluation result achieving B or greater is desirable.

[Evaluation Criteria]
A: The result up to 70% duty is X, and printing up to this duty is possible without bleeding.
B: The result up to 50% duty is X, and printing up to this duty is possible without bleeding.
C: The result of 40% duty or more is Y, and bleeding occurs when the duty is 40%.

Examples 2-18

Adhesiveness and bleeding were evaluated in the same manners as in Example 1 except that the surface processing composition, non-white ink and white ink were changed as presented in the Table 4-7.

Examples 19

Adhesiveness and bleeding were evaluated in the same manners as in Example 1 except that each film was not subjected to corona treatment.

Examples 20

Adhesiveness and bleeding were evaluated in the same manners as in Example 1 except that the test image was not heated after the non-white ink 1 and the non-white ink 2 was printed.

Examples 21

Adhesiveness and bleeding were evaluated in the same manners as in Example 1 except that the white ink solid image was not heated after the white ink was printed.

Comparative Example 1-18

Adhesiveness and bleeding were evaluated in the same manners as in Example 1 except that the surface processing composition, non-white ink and white ink were changed as presented in the Table 8-11.

Comparative Example 19

Adhesiveness and bleeding were evaluated in the same manners as in Comparative Example 1 except that the surface processing composition was not applied.

TABLE 4

|  |  | Example | | | | |
|---|---|---|---|---|---|---|
|  |  | 1 | 2 | 3 | 4 | 5 |
| Used liquid | Surface processing composition (preparation Example No.) | No. 1 | No. 2 | No. 3 | No. 4 | No. 5 |
|  | Non-white ink 1 (preparation Example No.) | No. 1 | No. 5 | No. 6 | No. 2 | No. 3 |
|  | Non-white ink 2 (preparation Example No.) | No. 2 | No. 3 | No. 4 | No. 3 | No. 4 |
|  | White ink (preparation Example No.) | No. 1 | No. 2 | No. 3 | No. 1 | No. 2 |
| Condition | Surface treatment heating treatment 1 | Corona 80° C. 2 min. | Corona 80° C. 2 min. | Corona 80° C. 2 min. | Corona 80° C. 2 min. | Corona 80° C. 2 min. |

TABLE 4-continued

| | | | Example | | | | |
|---|---|---|---|---|---|---|---|
| | | | 1 | 2 | 3 | 4 | 5 |
| | heating treatment 2 | | 80° C. 2 min. | 80° C. 2 min. | 80° C. 2 min. | 80° C. 2 min. | 80° C. 2 min. |
| Evaluation results | Evaluation of adhesiveness | OPP | A | A | A | B | A |
| | | PET | A | A | A | A | A |
| | | ONY | A | A | A | A | A |
| | Evaluation of bleeding on color boundary | OPP | A | B | A | A | B |
| | | PET | A | A | A | A | A |
| | | ONY | A | A | A | A | A |

TABLE 5

| | | | Example | | | | |
|---|---|---|---|---|---|---|---|
| | | | 6 | 7 | 8 | 9 | 10 |
| Used liquid | Surface processing composition (preparation Example No.) | | No. 6 | No. 7 | No. 1 | No. 2 | No. 3 |
| | Non-white ink 1 (preparation Example No.) | | No. 2 | No. 1 | No. 5 | No. 6 | No. 2 |
| | Non-white ink 2 (preparation Example No.) | | No. 4 | No. 2 | No. 3 | No. 4 | No. 3 |
| | White ink (preparation Example No.) | | No. 3 | No. 1 | No. 2 | No. 3 | No. 1 |
| Condition | Surface treatment | | Corona | Corona | Corona | Corona | Corona |
| | heating treatment 1 | | 80° C. 2 min. | 80° C. 2 min. | 80° C. 2 min. | 80° C. 2 min. | 80° C. 2 min. |
| | heating treatment 2 | | 80° C. 2 min. | 80° C. 2 min. | 80° C. 2 min. | 80° C. 2 min. | 80° C. 2 min. |
| Evaluation results | Evaluation of adhesiveness | OPP | B | B | A | A | A |
| | | PET | A | A | A | A | A |
| | | ONY | A | A | A | A | A |
| | Evaluation of bleeding on color boundary | OPP | A | A | B | A | A |
| | | PET | A | A | A | A | A |
| | | ONY | A | A | A | A | A |

TABLE 6

| | | | Example | | | | |
|---|---|---|---|---|---|---|---|
| | | | 11 | 12 | 13 | 14 | 15 |
| Used liquid | Surface processing composition (preparation Example No.) | | No. 4 | No. 5 | No. 6 | No. 7 | No. 1 |
| | Non-white ink 1 (preparation Example No.) | | No. 3 | No. 2 | No. 1 | No. 5 | No. 6 |
| | Non-white ink 2 (preparation Example No.) | | No. 4 | No. 4 | No. 2 | No. 3 | No. 4 |
| | White ink (preparation Example No.) | | No. 2 | No. 3 | No. 1 | No. 2 | No. 3 |
| Condition | Surface treatment | | Corona | Corona | Corona | Corona | Corona |
| | heating treatment 1 | | 80° C. 2 min. | 80° C. 2 min. | 80° C. 2 min. | 80° C. 2 min. | 80° C. 2 min. |
| | heating treatment 2 | | 80° C. 2 min. | 80° C. 2 min. | 80° C. 2 min. | 80° C. 2 min. | 80° C. 2 min. |
| Evaluation results | Evaluation of adhesiveness | OPP | B | A | B | B | A |
| | | PET | A | A | A | A | A |
| | | ONY | A | A | A | A | A |

TABLE 6-continued

|  |  | Example |  |  |  |  |
|---|---|---|---|---|---|---|
|  |  | 11 | 12 | 13 | 14 | 15 |
| Evaluation of bleeding on color boundary | OPP | B | A | A | A | A |
|  | PET | A | A | A | A | A |
|  | ONY | A | A | A | A | A |

TABLE 7

|  |  |  | Example |  |  |  |  |  |
|---|---|---|---|---|---|---|---|---|
|  |  |  | 16 | 17 | 18 | 19 | 20 | 21 |
| Used liquid | Surface processing composition (preparation Example No.) |  | No. 2 | No. 3 | No. 4 | No. 1 | No. 1 | No. 1 |
|  | Non-white ink 1 (preparation Example No.) |  | No. 2 | No. 3 | No. 2 | No. 1 | No. 1 | No. 1 |
|  | Non-white ink 2 (preparation Example No.) |  | No. 3 | No. 4 | No. 4 | No. 2 | No. 2 | No. 2 |
|  | White ink (preparation Example No.) |  | No. 1 | No. 2 | No. 3 | No. 1 | No. 1 | No. 1 |
| Condition | Surface treatment |  | Corona | Corona | Corona | Non-treated | Corona | Corona |
|  | heating treatment 1 |  | 80° C. 2 min. | 80° C. 2 min. | 80° C. 2 min. | 80° C. 2 min. | Non-treated | 80° C. 2 min. |
|  | heating treatment 2 |  | 80° C. 2 min. | 80 C 2 min. | 80° C. 2 min. | 80° C. 2 min. | 80° C. 2 min. | Non-treated |
| Evaluation results | Evaluation of adhesiveness | OPP | A | A | B | B | B | B |
|  |  | PET | A | A | A | A | A | A |
|  |  | ONY | A | A | A | A | A | A |
|  | Evaluation of bleeding on color boundary | OPP | A | B | A | B | B | B |
|  |  | PET | A | A | A | B | B | B |
|  |  | ONY | A | A | A | B | B | B |

TABLE 8

|  |  |  | Comparative Example |  |  |  |  |
|---|---|---|---|---|---|---|---|
|  |  |  | 1 | 2 | 3 | 4 | 5 |
| Used liquid | Surface processing composition (preparation Example No.) |  | No. 8 | No. 9 | No. 10 | No. 8 | No. 9 |
|  | Non-white ink 1 (preparation Example No.) |  | No. 1 | No. 5 | No. 6 | No. 2 | No. 3 |
|  | Non-white ink 2 (preparation Example No.) |  | No. 2 | No. 3 | No. 4 | No. 3 | No. 4 |
|  | White ink (preparation Example No.) |  | No. 1 | No. 2 | No. 3 | No. 1 | No. 2 |
| Condition | Surface treatment |  | Corona | Corona | Corona | Corona | Corona |
|  | heating treatment 1 |  | 80° C. 2 min. | 80° C. 2 min. | 80° C. 2 min. | 80° C. 2 min. | 80° C. 2 min. |
|  | heating treatment 2 |  | 80° C. 2 min. | 80° C. 2 min. | 80° C. 2 min. | 80° C. 2 min. | 80° C. 2 min. |
| Evaluation results | Evaluation of adhesiveness | OPP | C | C | C | C | C |
|  |  | PET | B | B | B | B | B |
|  |  | ONY | C | B | B | C | B |
|  | Evaluation of bleeding on color boundary | OPP | A | A | A | A | A |
|  |  | PET | A | A | A | A | A |
|  |  | ONY | A | A | A | A | A |

TABLE 9

|  |  | Example | | | | |
|---|---|---|---|---|---|---|
|  |  | 6 | 7 | 8 | 9 | 10 |
| Used liquid | Surface processing composition (preparation Example No.) | No. 10 | No. 1 | No. 2 | No. 3 | No. 4 |
|  | Non-white ink 1 (preparation Example No.) | No. 2 | No. 2 | No. 3 | No. 4 | No. 7 |
|  | Non-white ink 2 (preparation Example No.) | No. 4 | No. 7 | No. 8 | No. 9 | No. 8 |
|  | White ink (preparation Example No.) | No. 3 | No. 1 | No. 2 | No. 3 | No. 1 |
| Condition | Surface treatment | Corona | Corona | Corona | Corona | Corona |
|  | heating treatment 1 | 80° C. 2 min. | 80° C. 2 min. | 80° C. 2 min. | 80° C. 2 min. | 80° C. 2 min. |
|  | heating treatment 2 | 80° C. 2 min. | 80° C. 2 min. | 80° C. 2 min. | 80° C. 2 min. | 80° C. 2 min. |
| Evaluation results | Evaluation of adhesiveness | OPP | C | A | A | A | A |
|  |  | PET | B | A | A | A | A |
|  |  | ONY | B | A | A | A | A |
|  | Evaluation of bleeding on color boundary | OPP | A | C | C | C | C |
|  |  | PET | A | C | C | C | C |
|  |  | ONY | A | C | C | C | C |

TABLE 10

|  |  | Comparative Example | | | | |
|---|---|---|---|---|---|---|
|  |  | 11 | 12 | 13 | 14 | 15 |
| Used liquid | Surface processing composition (preparation Example No.) | No. 5 | No. 6 | No. 1 | No. 2 | No. 3 |
|  | Non-white ink 1 (preparation Example No.) | No. 8 | No. 7 | No. 1 | No. 5 | No. 6 |
|  | Non-white ink 2 (preparation Example No.) | No. 9 | No. 9 | No. 2 | No. 3 | No. 4 |
|  | White ink (preparation Example No.) | No. 2 | No. 3 | No. 4 | No. 5 | No. 6 |
| Condition | Surface treatment | Corona | Corona | Corona | Corona | Corona |
|  | heating treatment 1 | 80° C. 2 min. | 80° C. 2 min. | 80° C. 2 min. | 80° C. 2 min. | 80° C. 2 min. |
|  | heating treatment 2 | 80° C. 2 min. | 80° C. 2 min. | 80° C. 2 min. | 80° C. 2 min. | 80° C. 2 min. |
| Evaluation results | Evaluation of adhesiveness | OPP | A | B | A | A | A |
|  |  | PET | A | A | A | A | A |
|  |  | ONY | A | A | A | A | A |
|  | Evaluation of bleeding on color boundary | OPP | C | C | C | C | C |
|  |  | PET | C | C | C | C | C |
|  |  | ONY | C | C | C | C | C |

TABLE 11

|  |  | Comparative Example | | | |
|---|---|---|---|---|---|
|  |  | 16 | 17 | 18 | 19 |
| Used liquid | Surface processing composition (preparation Example No.) | No. 4 | No. 5 | No. 6 | Not used |
|  | Non-white ink 1 (preparation Example No.) | No. 2 | No. 3 | No. 2 | No. 1 |
|  | Non-white ink 2 (preparation Example No.) | No. 3 | No. 4 | No. 4 | No. 2 |
|  | White ink (preparation Example No.) | No. 4 | No. 5 | No. 6 | No. 1 |
| Condition | Surface treatment | Corona | Corona | Corona | Corona |
|  | heating treatment 1 | 80° C. 2 min. | 80° C. 2 min. | 80° C. 2 min. | 80° C. 2 min. |
|  | heating treatment 2 | 80° C. 2 min. | 80° C. 2 min. | 80° C. 2 min. | 80° C. 2 min. |
| Evaluation results | Evaluation of adhesiveness OPP | A | A | B | C |
|  | PET | A | A | A | C |
|  | ONY | A | A | A | C |
|  | Evaluation of bleeding on color boundary OPP | C | C | C | C |
|  | PET | C | C | C | C |
|  | ONY | C | C | C | C |

In Tables 4-11, the heating treatment 1 represents a heat treatment after non-white ink printing, and the heating treatment 2 represents a heat treatment after white ink printing.

Examples 1, 3, 9, 10, 12, 15, 16 are preferred examples of the present disclosure. In these examples, the evaluation of adhesiveness and bleeding were A for all the substrates.

In Examples 4, 11 and 18, Tg of the urethane resin particle was out of the range of from −25 degrees C. to 25 degrees C. Although the evaluation of the adhesiveness in the OPP film was B, there was no problem in use.

In Examples 2, 5, 8, 11, 14 and 17, Tg of the acrylic resin particle was out of the range of from 0 degrees C. to 100 degrees C. Although the evaluation of the adhesiveness or bleeding in the OPP film was B, there was no problem in use.

In Examples 6, 7, 13, and 14, the content rate of the urethane resin particle in the surface processing composition was outside the range of from 0.5% to 20% by mass. Since the amount of the urethane resin particle in the surface processing composition of Examples 6 and 13 was little and the film was not sufficiently covered, the adhesiveness was low. Since the amount of the urethane resin particle in the surface processing composition of Examples 7 and 14 was large and the film thickness was large, the adhesiveness was low. Although the evaluation of the adhesiveness was B, there was no problem in use.

In Example 19, the surface modification treatment of the substrate was not performed. In this case, coating unevenness of the surface processing composition occurred and adhesiveness was not improved, therefore evaluation of adhesion and bleeding was low. Although the evaluation of the adhesiveness and bleeding was B, there was no problem in use.

In Examples 20-21, no heat treatment was performed after printing. In this case, curing of the resin in the ink did not proceed promptly, therefore evaluation of adhesion and bleeding was low. Although the evaluation of the adhesiveness and bleeding was B, there was no problem in use.

In Comparative Examples 1-6, urethane resin particle was not contained in the surface processing composition. In Comparative Examples 7-12, the resin in either the non-white ink 1 or the non-white ink 2 was not the acrylic resin. In Comparative Examples 13-18, the white ink did not contain the acrylic resin particle. In Comparative Examples 1-18, the evaluation of adhesion or bleeding was C. Therefore, Comparative Examples 1-18 did not improve the evaluation of adhesion or bleeding in the case of using three types of substrates OPP, PET, and ONY. In Comparative Example 19, no surface processing composition was applied. In Comparative Example 19, there was a problem both in adhesiveness evaluation and bleeding evaluation.

Although the content of calcium acetate in the surface processing composition was 1.76 parts or 3.52 parts, the concentration of calcium acetate did not affect the evaluation.

Examples 22

Adhesiveness and bleeding were evaluated in the same manners as in Example 1 except that the non-white ink 2 was not used. For the evaluation of bleeding, bleeding at the portion where the non-white ink (black ink) and the white ink were in contact was observed for each duty and evaluated based on the above criteria.

Comparative Example 20

Adhesiveness and bleeding were evaluated in the same manners as in Comparative Example 1 except that the non-white ink 2 was not used. For the evaluation of bleeding, bleeding at the portion where the non-white ink (black ink) and the white ink were in contact was observed for each duty and evaluated based on the above criteria in the same manners as in Example 22.

Comparative Example 21

Adhesiveness and bleeding were evaluated in the same manners as in Comparative Example 10 except that the non-white ink 2 was not used. For the evaluation of bleeding, bleeding at the portion where the non-white ink (black ink) and the white ink were in contact was observed for each duty and evaluated based on the above criteria in the same manners as in Example 22.

Comparative Example 22

Adhesiveness and bleeding were evaluated in the same manners as in Comparative Example 13 except that the non-white ink 2 was not used. For the evaluation of bleeding, bleeding at the portion where the non-white ink (black ink) and the white ink were in contact was observed for each duty and evaluated based on the above criteria in the same manners as in Example 22.

TABLE 12

|  |  | Example | Comparative Example | | |
|---|---|---|---|---|---|
|  |  | 22 | 20 | 21 | 22 |
| Used liquid | Surface processing composition (preparation Example No.) | No. 1 | No. 8 | No. 4 | No. 1 |
|  | Non-white ink (preparation Example No.) | No. 1 | No. 1 | No. 8 | No. 1 |

TABLE 12-continued

|  |  |  | Example | Comparative Example | | |
|---|---|---|---|---|---|---|
|  |  |  | 22 | 20 | 21 | 22 |
|  | White ink (preparation Example No.) |  | No. 1 | No. 1 | No. 1 | No. 4 |
| Evaluation results | Evaluation of adhesiveness | OPP | A | C | A | A |
|  |  | PET | A | B | A | A |
|  |  | ONY | A | C | A | A |
|  | Evaluation of bleeding on color boundary | OPP | A | A | C | C |
|  |  | PET | A | A | C | C |
|  |  | ONY | A | A | C | C |

In Example 22, the evaluation of adhesiveness and bleeding were A in all the substrates. In Comparative Example 20, urethane resin particle was not contained in the surface processing composition. In Comparative Example 21, the resin in the non-white ink was not the acrylic resin. In Comparative Example 22, the white ink did not contain the acrylic resin particle. In Comparative Examples 20-22, the evaluation of adhesion or bleeding was C. Therefore, Comparative Examples 20-22 did not improve the evaluation of adhesion or bleeding in the case of using three types of substrates OPP, PET, and ONY.

What is claimed is:

1. An image forming method for forming an image on a non-absorbable substrate comprising in the order listed:
   (a) applying a surface processing composition comprising water, a first water soluble organic solvent, and a urethane resin particle to the non-absorbable substrate;
   (b) applying a non-white ink comprising water, a second water soluble organic solvent, and a second acrylic resin particle to obtain a layer of non-white ink; and
   (c) applying a white ink comprising water, a third water soluble organic solvent, a third acrylic resin particle, and a white colorant over the non-white ink layer to obtain a white ink layer over the non-white ink layer;
   wherein the non-absorbable substrate is a resin film.

2. The image forming method of claim 1,
   wherein the non-white ink comprises a non-white colorant, and
   wherein (b) comprises applying multiple kinds of the non-white ink.

3. The image forming method of claim 1, wherein the urethane resin particle has a glass transition temperature (Tg) of from −25° C. to 25° C.

4. The image forming method of claim 1, wherein the urethane resin particle accounts for 0.5 to 20 percent by mass of the surface processing composition.

5. The image forming method of claim 1, wherein the second acrylic resin particle and third acrylic resin particle each independently have a glass transition temperature (Tg) of from 0° C. to 100° C.

6. The image forming method of claim 1, further comprising:
   (d) reforming a surface of the non-absorbable substrate.

7. An image forming apparatus for forming an image on a non-absorbable substrate comprising:
   a first applier configured to apply a surface processing composition comprising water, a first water soluble organic solvent, and a urethane resin particle to the non-absorbable substrate;
   a second applier configured to apply a non-white ink comprising water, a second water soluble organic solvent, and a second acrylic resin particle; and
   a third applier configured to apply a white ink comprising water, a third water soluble organic solvent, a third acrylic resin particle, and a white colorant.

8. A method of manufacturing printed matter comprising, in the order listed:
   (a) applying a surface processing composition comprising water, a first water soluble organic solvent, and a urethane resin particle to a non-absorbable substrate;
   (b) applying a non-white ink comprising water, a second water soluble organic solvent, and a second acrylic resin particle to obtain a layer of non-white ink; and
   (c) applying a white ink comprising water, a third water soluble organic solvent, a third acrylic resin particle, and a white colorant over the non-white ink layer to obtain a white ink layer over the non-white ink layer;
   wherein the non-absorbable substrate is a resin film.

9. The image forming method of claim 1, wherein a thickness of the white ink layer is from 1 μm to 4 μm.

10. The method of claim 8, wherein a thickness of the white ink layer is from 1 μm to 4 μm.

* * * * *